(12) United States Patent
Zhernakov et al.

(10) Patent No.: US 11,905,821 B2
(45) Date of Patent: Feb. 20, 2024

(54) OFFSET WELL ANALYSIS USING WELL TRAJECTORY SIMILARITY

(71) Applicant: Schlumberger Technology Corporation, Sugar Land, TX (US)

(72) Inventors: Vladimir Zhernakov, Tyumen (RU); Xiaotong Suo, Stanford, CA (US); Jose Celaya Galvan, Menlo Park, CA (US); Velizar Vesselinov, Katy, TX (US); Neil Holger White Eklund, Oakland, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 352 days.

(21) Appl. No.: 16/541,148

(22) Filed: Aug. 15, 2019

(65) Prior Publication Data

US 2021/0047914 A1 Feb. 18, 2021

(51) Int. Cl.
*E21B 47/022* (2012.01)
*E21B 44/00* (2006.01)
*G01V 99/00* (2009.01)
*E21B 49/00* (2006.01)
*E21B 41/00* (2006.01)

(52) U.S. Cl.
CPC ............ *E21B 47/022* (2013.01); *E21B 44/00* (2013.01); *G01V 99/005* (2013.01); *E21B 41/0092* (2013.01); *E21B 49/00* (2013.01)

(58) Field of Classification Search
CPC ........ E21B 47/022; E21B 44/00; E21B 49/00; G01V 99/005
See application file for complete search history.

(56) References Cited

U.S. PATENT DOCUMENTS

2004/0210394 A1* 10/2004 Trappe ............... G01V 1/32
702/14
2006/0247903 A1 11/2006 Schottle et al.
(Continued)

FOREIGN PATENT DOCUMENTS

WO 2018217679 A1 11/2018
WO 2019161343 A1 8/2019

OTHER PUBLICATIONS

Elmore, Kimberly, "Euclidean Distance as a Similarity Metric for Principal Component Analysis", Weather Monthly Review, 2001 (Year: 2001).*
(Continued)

*Primary Examiner* — Catherine T. Rastovski
*Assistant Examiner* — Yossef Korang-Beheshti
(74) *Attorney, Agent, or Firm* — Aashish Y. Chawla (57) ABSTRACT

A method for offset well analysis includes receiving offset well data collected from an offset well, the offset well data including data representing a trajectory of an offset well, receiving subject well data comprising a trajectory of at least a portion of a subject well, partitioning the trajectory of the offset well into a plurality of offset well segments, partitioning the trajectory of the subject well into a plurality of subject well segments, determining a distance between at least some of the plurality of offset well segments and at least some of the plurality of subject well segments, selecting the offset well based in part on the distance, and performing an offset well analysis using the offset well and the subject well.

13 Claims, 8 Drawing Sheets

(56) References Cited

U.S. PATENT DOCUMENTS

| | | | |
|---|---|---|---|
| 2009/0234623 A1* | 9/2009 | Germain | E21B 41/00 |
| | | | 703/6 |
| 2011/0038527 A1* | 2/2011 | Liu | G06V 10/7515 |
| | | | 382/145 |
| 2012/0090834 A1 | 4/2012 | Imhof et al. | |
| 2012/0261135 A1* | 10/2012 | Nowak | G01V 1/301 |
| | | | 166/369 |
| 2016/0090822 A1* | 3/2016 | Lu | E21B 7/10 |
| | | | 703/1 |
| 2018/0106133 A1* | 4/2018 | Bolchover | E21B 41/0092 |
| 2019/0003297 A1 | 1/2019 | Brannigan et al. | |
| 2019/0257189 A1* | 8/2019 | Bang | E21B 47/09 |
| 2020/0183042 A1* | 6/2020 | Amidi | G01V 5/045 |

OTHER PUBLICATIONS

Shimodaira, Hiroshi, "Similarity and Recommender Systems", 2015 (Year: 2015).*
Chen, et al. "Noisy logo recognition using line segment hausdorff distance," Pattern Recognition, 36 (2003), pp. 943-955.
International Search Report and Written Opinion dated Oct. 30, 2020 for international Patent PCT/US2020/041933.
Extended Search Report issued in European Patent Application No. 20852989.1 dated Aug. 11, 2023, 7 pages.

* cited by examiner

OFFSET WELL ANALYSIS USING WELL TRAJECTORY SIMILARITY

BACKGROUND

When planning, drilling, or engineering a well, experiential data recorded while drilling and completing other wells is often used to assist in the process. This is often referred to as "offset well analysis" or OWA. In OWA, a data set of drilling parameters, observations, geological characteristics, etc. of offset wells is provided. A driller, planner, etc., may access this data set and identify wells that are likely to include useful information about the risk of various hazards, drilling parameters that were beneficial, and the like, and apply them to the design and drilling of a new well.

Thus, OWA may assist users in identifying potential problem areas in the formation and/or the subject well, so that they can be addressed in the planning phase. OWA may also allow a user to identify past events on similar wells that might influence well design, equipment selection and schedule, identify beneficial practices from similar wells that should be continued, provide the information to conduct a risk analysis, establish a baseline measure performance for benchmarking, identify potential constraints and areas of opportunity, and/or validate new well design assumptions One challenge in OWA is identifying the wells that are likely to include helpful information, as the data set can contain vast numbers of wells, many of which are dissimilar from the subject well and thus unlikely to be of much assistance. The initial step for OWA is a selection of relevant offset wells with geometrical and geological similarity. Trajectory similarity analysis (geometrical type) in most of the cases is done considering existing wells from within the vicinity of planned well, through search and basic filtering by trajectory type, maximum inclination and hole depth. Accordingly, OWA often resolves to a time-consuming, manual process by which a user searches through and analyzes drilling reports, logs, downhole data, etc. of geographically close wells.

SUMMARY

A method for offset well analysis is disclosed. The method includes receiving offset well data collected from an offset well, the offset well data including data representing a trajectory of an offset well, receiving subject well data comprising a trajectory of at least a portion of a subject well, partitioning the trajectory of the offset well into a plurality of offset well segments, partitioning the trajectory of the subject well into a plurality of subject well segments, determining a distance between at least some of the plurality of offset well segments and at least some of the plurality of subject well segments, selecting the offset well based in part on the distance, and performing an offset well analysis using the offset well and the subject well.

A computing system is disclosed. The computing system includes one or more processors, and a memory system including one or more non-transitory computer-readable media storing instructions that, when executed by at least one of the one or more processors, cause the computing system to perform operations. The operations include receiving offset well data collected from an offset well, the offset well data including data representing a trajectory of an offset well, receiving subject well data comprising a trajectory of at least a portion of a subject well, partitioning the trajectory of the offset well into a plurality of offset well segments, partitioning the trajectory of the subject well into a plurality of subject well segments, determining a distance between at least some of the plurality of offset well segments and at least some of the plurality of subject well segments, selecting the offset well based in part on the distance, and performing an offset well analysis using the offset well and the subject well.

A non-transitory computer-readable media is disclosed. The medium stores instructions that, when executed by one or more processors of a computing system, cause the computing system to perform operations. The operations include receiving offset well data collected from an offset well, the offset well data including data representing a trajectory of an offset well, receiving subject well data comprising a trajectory of at least a portion of a subject well, partitioning the trajectory of the offset well into a plurality of offset well segments, partitioning the trajectory of the subject well into a plurality of subject well segments, determining a distance between at least some of the plurality of offset well segments and at least some of the plurality of subject well segments, selecting the offset well based in part on the distance, and performing an offset well analysis using the offset well and the subject well It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
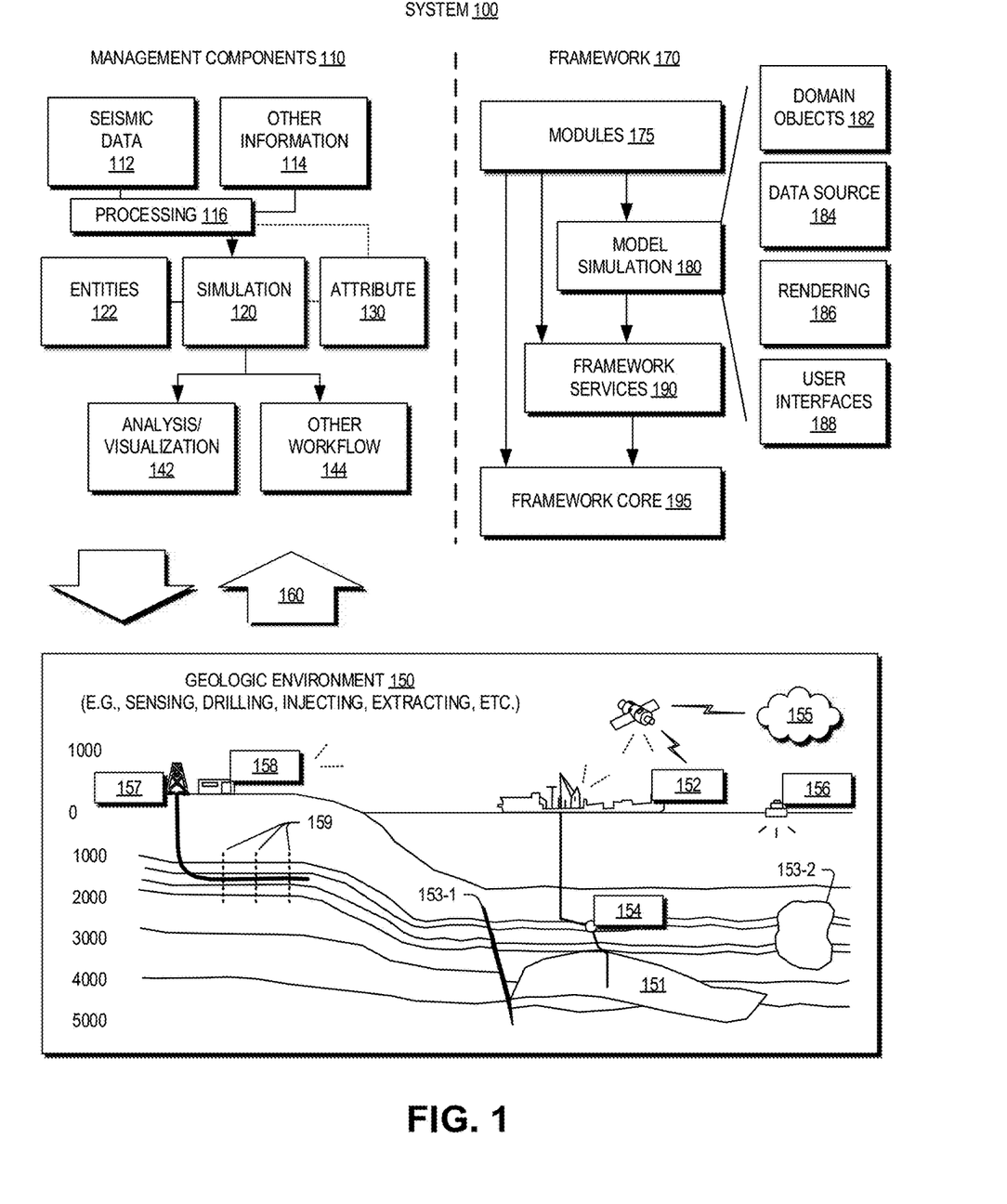
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas)

allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETRE® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
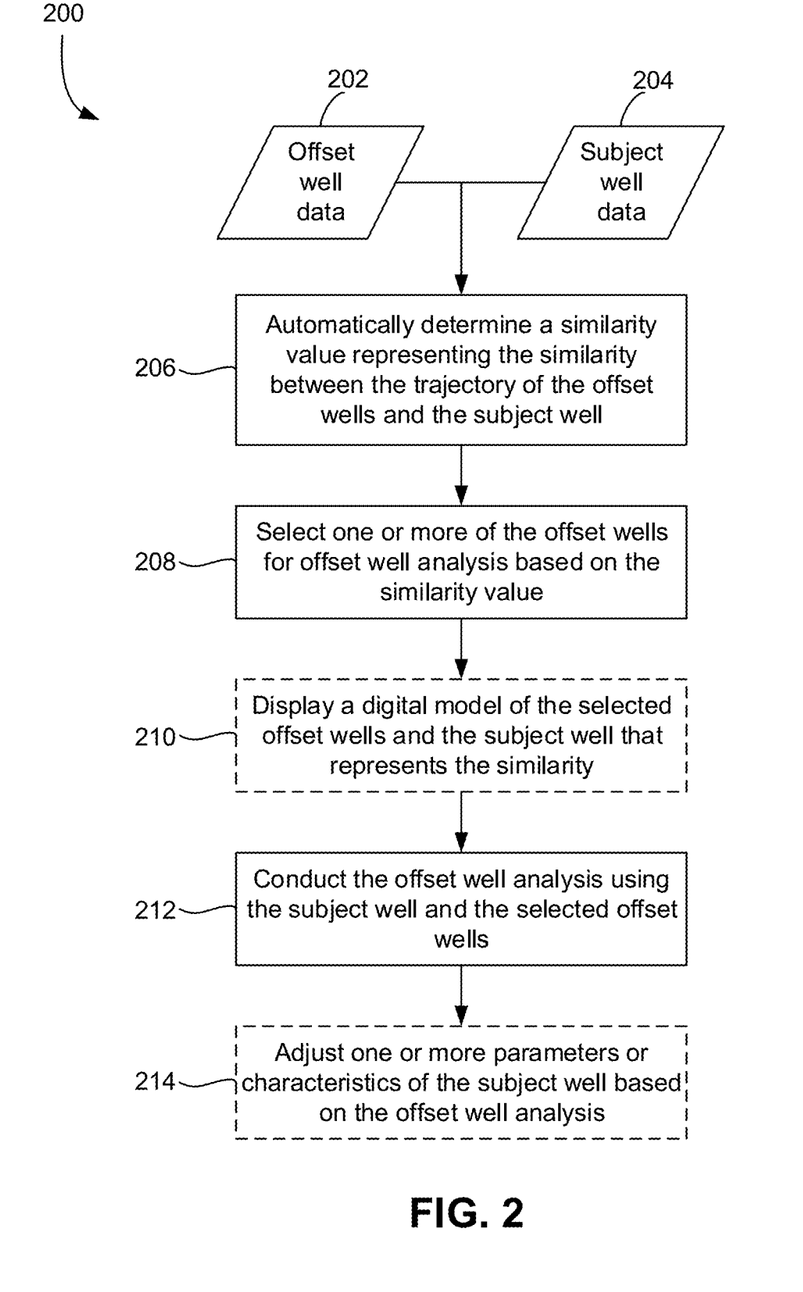
FIG. 2 illustrates a flowchart of a method for offset well analysis, according to an embodiment.

FIG. 2 illustrates a flowchart of a method 200 for offset well analysis, according to an embodiment. The method 200 employs the concept of "distance" between two wells. As the term is used herein, "distance" means the difference in shape and/or orientation of two wells, e.g., if they were considered to start at the same location (or shared another point in common), and not the physical, geographical distance between the drilling locations of two wells. The distance calculation is thus a measurement that represents a similarity between two wells.

The distance calculation allows for an automatic comparison of the offset wells to a subject well, thereby allowing for an automatic selection of the offset wells with the highest quantitative similarity (e.g., least distance) to be employed in an offset well analysis. As such, the identification of the wells, which was previously a manual process, is done automatically by the application of rules that define the similarity of the offset wells to the subject well. This may lead to the subjective, human-based approach being partially replaced with a more objective, repeatable process, completed at least in part by a computer. For example, the vast number of offset wells may be reduced based on the similarity value, allowing a human user to select from a manageable number of wells for further analysis. This may have various practical applications, including providing a display of the most-similar wells (e.g., shortest distance) and/or leading to changes in a well drilling plan. Further, the selection of the most-appropriate wells may increase the accuracy of the offset well analysis, and thus may lead to refinements in the subject well (e.g., trajectory, drilling parameters, etc.) that may avoid certain drilling risks, increase the rate of penetration, increase efficiency, or otherwise assist in the drilling process that might otherwise not have been realized.

Turning to the specific, illustrated embodiment of FIG. 2, the method 200 includes receiving offset well data, as at 202, and subject well data, as at 204, as input. The offset well data may be data collected while drilling previous wells, whether geographically nearby or not. The offset well data may include various drilling parameters, wellbore trajectory, and may include observations, e.g., in the form of drilling logs, which may be linked to the depth of the offset well. The offset well data thus includes experiential data about wells that were previously drilled, e.g., what worked, what led to hazardous conditions, etc. In contrast, the subject well data may be a well plan for a well that has not yet been drilled or is partially drilled. The subject well data may specify similar characteristics as the offset well data, such as trajectory, drilling parameters, etc.

The method 200 may then include automatically determining a distance representing the similarity between the trajectory of the offset wells and the subject well, as at 206. The automatic determination at 206 may be done by a computer processor, according to a rules-based algorithm for determining distance. To begin, the surface location (or another location) of the offset well and the subject well may be considered to coincide. The calculated distance may be Euclidian. In other embodiments, the distance may be a modified Hausdorff distance, as will be described below. Further, in some embodiments, two or more distances may be calculated, e.g., along all, a portion, or one or more segments of the offset wells and the subject well, and combined to define a composite distance measurement, which may be a straight combination/superposition, an average, a weighted average, or any other type of combination.

The method 200 may then proceed to selecting one or more of the offset wells based in part on the distance, as at 208. For example, a threshold distance may be established, either predetermined, entered by a user, or otherwise determined, and any offset wells with a calculated distance that is lower than the threshold may be selected. In another embodiment, a number of wells with the lowest distance (highest similarity) may be determined, and then that number selected, e.g., from a ranked list of the offset wells. The selection of offset wells based on the distance may serve to reduce the number of offset wells that a user may choose from to a number that is more manageable to a human, for example, a dozen wells, rather than a thousand. The user may then further select from the wells, e.g., based on other factors and/or subjectively.

In some embodiments, the method 200 may include displaying a digital model of the selected offset wells and the subject well that visually depicts the similarity/distance, as at 210. Such a digital display may assist in the offset well analysis by allowing for a manual selection of the similar wells, e.g., allowing for a user to discount wells with a similarity that becomes too attenuated. Further, the display may provide the user the ability to make a more subjective comparison of the well trajectories or a comparison of attributes not considered so far in the similarity metric used at the time. For example, some curvatures for a well that have multiple targets may not be considered in the metric but may remain relevant to some users (but not to other users). Thus, the visual display may provide an additional tool to allow a user to make a custom, potentially subjective/qualitative determination, while factoring in the similarity metric.

The method 200 may then proceed to conducting an offset well analysis using the subject well and the selected offset wells, as at 212. The offset well analysis may be conducted in any suitable manner but may be based on the wells identified as having sufficient similarity at 210. Accordingly, the result of the offset well analysis may inform the well/drilling plan of the subject well. As such, in some embodiments, one or more parameters or characteristics of the subject well may be adjusted, as at 214, as a result of and according to the offset well analysis. For example, drilling parameters (e.g., weight on bit, rotation speed, mud weight, etc.), or geometric parameters (e.g., dog leg severity) may be adjusted based on risks identified in the offset wells, among various other changes that may be made.

Figure 3:
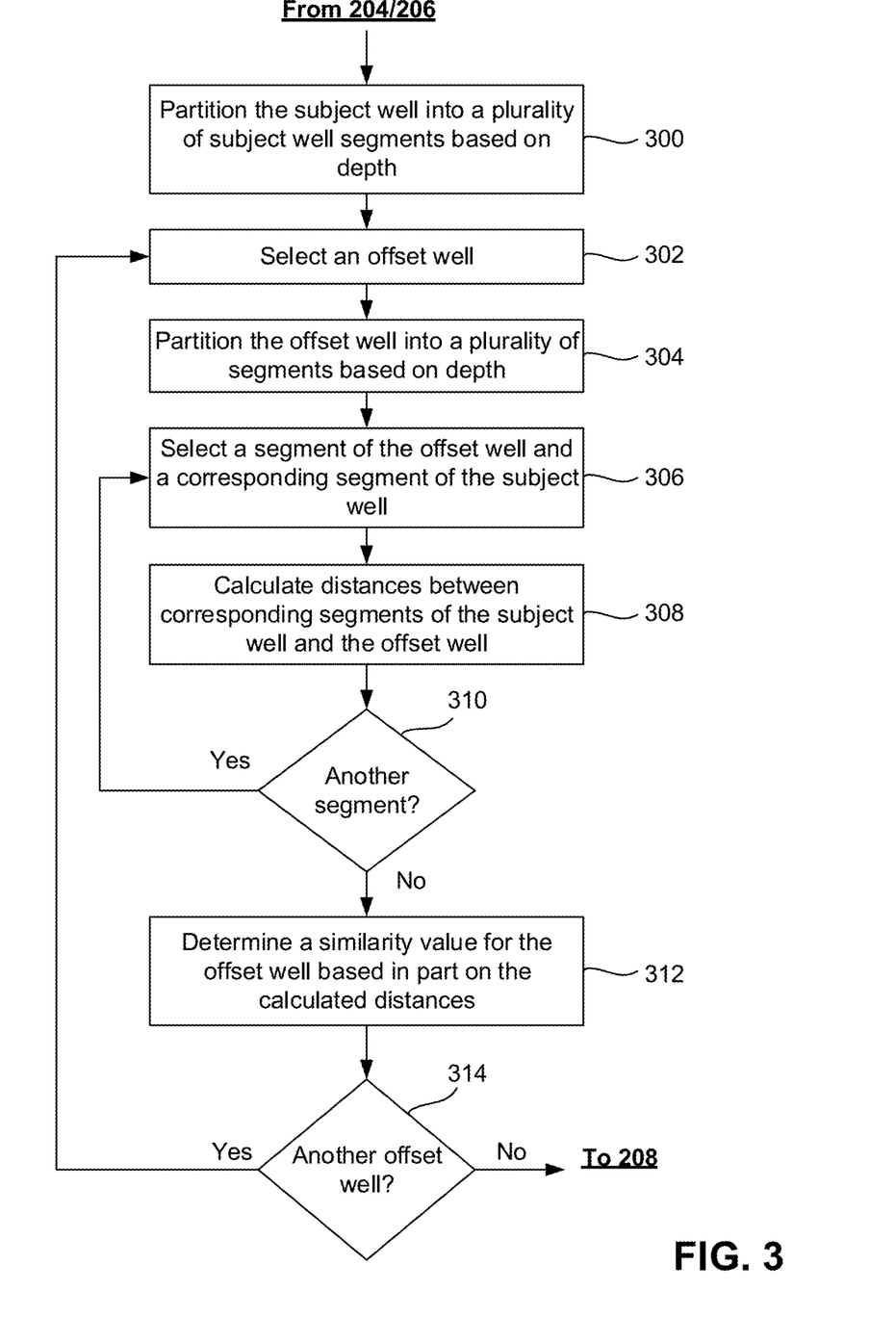
FIG. 3 illustrates a flowchart of a distance calculation process, according to an embodiment.

FIG. 3 illustrates a flowchart of the process for determining the distance representing the similarity at 206 (hereinafter, "the process 206"), according to an embodiment. The process 206 may include partitioning a subject well into a plurality of subject well depth segments based on depth, as at 300. Further, one of the offset wells from the offset well data may be selected, as at 302

In some embodiments, the selected offset well may be partitioned into a plurality of segments based on depth, whether in the sense of the physical length of the well from the surface or true vertical depth from the surface, as at 304. These segments may then be compared to determine the distance between the wells. In some embodiments, all segments may be compared. In other embodiments, a depth of interest may be selected, and segments that are contained in that depth of interest may be used, and the others ignored.

Figure 4:
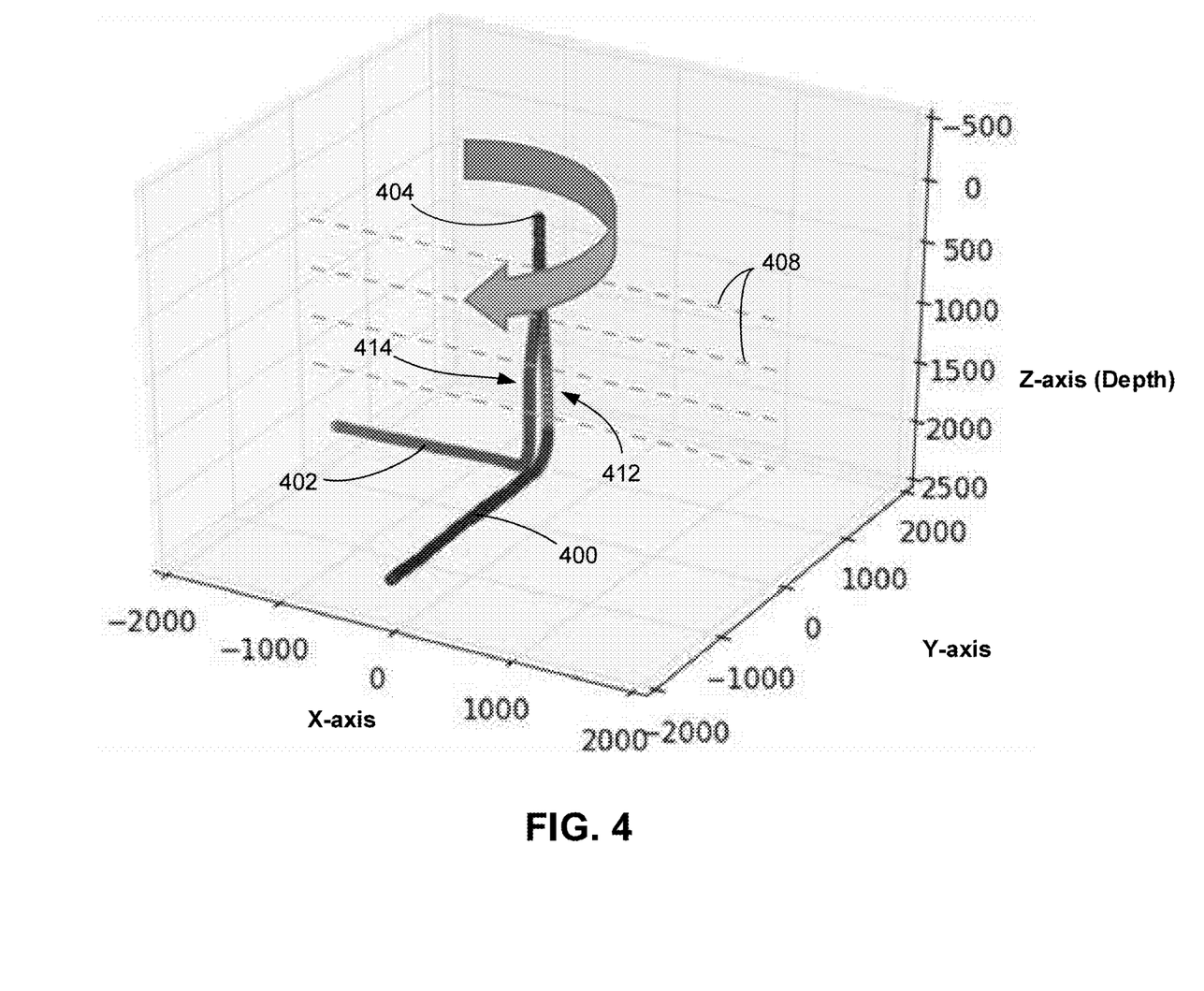
FIG. 4 illustrates a plot of a subject well and an offset well, according to an embodiment.

FIG. 4 illustrates a plot of a subject well 400 and an offset well 402, illustrating the partitioning discussed above. In particular, as shown, the subject well 400 and the offset well 402 are considered to originate at the surface (depth value, represented on the vertical axis, is 0) at a common point 404, as the subject and offset wells 400, 402 are considered to start at the same point on the surface. The trajectories of the wells 400, 402 are divergent as extending downward and along different azimuths (rotated apart, as indicated) and different inclinations. For example, the offset well 402 may turn toward the negative x-axis, as will be described in greater detail below. Further, lines 408 (four are shown) conceptually demark segments (e.g., segments 412 and 414 are indicated) of the wells 400, 402. Segments 412, 414 representing the same depth interval (e.g., between two of the same lines 408) may be considered to correspond to one another.

Referring again to FIG. 3, the process 206 may proceed to selecting a segment of the offset well and a corresponding segment of the subject well, as at 308. For example, in FIG. 4, the segments 412 and 414, which are "corresponding" as defined above may be selected. The process 206 may then proceed to calculating one or more distances between the corresponding segments of the subject well and the offset well, as at 310.

The distance calculation may proceed by calculating the Euclidian distance between the segments (again, either in the depth interval of interest, or along the entire well), which may yield an inclination and azimuth turn rate similarity. Calculating the Euclidian distance may proceed according to the basic distance formula:

$$d=\sqrt{(x_2-x_1)+(y_2-y_1)} \quad (1)$$

where d is the distance, $x_1$ is the inclination of the subject well, $x_2$ is the inclination of the offset well, $y_1$ is the azimuth turn rate of the offset well, and $y_2$ is the azimuth turn rate of the subject well. It will be appreciated that weighting coefficients could be used to change the relative weight of the azimuth turn rate difference and the inclination difference.

The distance calculation may instead or additionally proceed using a modified Hausdorff distance. For example, this may allow for inclination and azimuth similarity and/or shape similarity to be quantified. In either case, three different distance measures are calculated, and then aggregated to arrive at the distance, which provides the similarity value. Further, polar coordinates and measured depth may be used for this calculation. In the case of similarity analysis for a defined interval of interest (rather than the entire well), polar coordinates of the start point of the analysis may be set to zero and the coordinates below may be shifted for the actual value of the starting point.

In addition, for calculating the shape similarity, the trajectory (or segment) is applied to evaluate the direction and calculate a distance measure to find a minimum value. Thus, shape similarity provides a search of offset wells with directional similarity, without taking into account exact values of azimuth.

Figure 5:
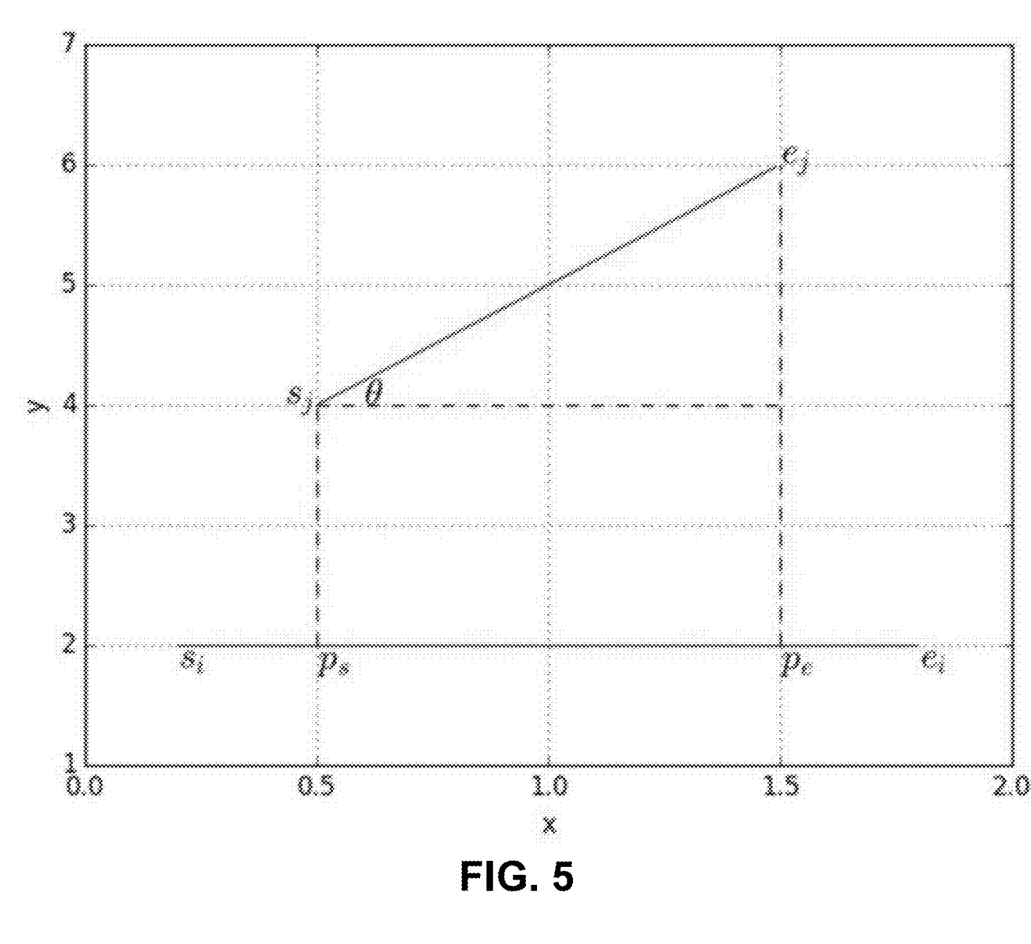
FIG. 5 illustrates a plot of two segments and a process of calculating one type of "distance" (e.g., a similarity value) therebetween, according to an embodiment.

FIG. 5 illustrates a basic example of calculating the modified Hausdorff distance, in this case, between two line segments. This calculation may be applied to wellbore trajectories in any one of several ways, e.g., on a segment-by-segment basis, or considering the wellbores as a whole, or in any other manner. Referring to the specific example of FIG. 5, a first line segment $L_i$ may be defined between the points $s_j$ and $e_j$, and may proceed at an angle θ, in relation to a second line segment $L_j$, which may extend between points $s_i$ and $e_i$.

The modified Hausdorff distance may be calculated as follows. First, a vertical distance $d_\perp$ may be calculated, as follows:

$$l_{\perp 1} = \|s_j - p_s\|_2 \quad (2)$$

$$l_{\perp 2} = \|e_j - p_e\|_2 \quad (3)$$

$$d_\perp(L_i, L_j) = \frac{l_{\perp 1}^2 + l_{\perp 2}^2}{l_{\perp 1} + l_{\perp 2}} \quad (4)$$

Further, a horizontal distance d may be calculated as:

$$l_1 = \|s_j - p_s\|_2 \quad (5)$$

$$l_2 = \|p_e - e_j\|_2 \quad (6)$$

$$d(l_i, l_j) = \mathrm{MIN}(l_1, l_2) \quad (7)$$

$$p_s = s_i + u_1 \cdot \overrightarrow{s_i e_i} \quad (8)$$

$$p_e = s_i + u_2 \cdot \overrightarrow{s_i e_i} \quad (9)$$

where $$u_1 = \frac{\overrightarrow{s_t s_j} \cdot \overrightarrow{s_t e_i}}{\|\overrightarrow{s_t e_i}\|^2} \quad (10)$$

$$u_2 = \frac{\overrightarrow{s_t s_j} \cdot \overrightarrow{s_t e_i}}{\|\overrightarrow{s_t e_i}\|^2} \quad (11)$$

and $$\cos(\theta) = \frac{\overrightarrow{s_i e_i} \cdot \overrightarrow{s_j e_j}}{\|\overrightarrow{s_i e_i}\|\|\overrightarrow{s_j e_j}\|} \quad (12)$$

which yields $$d_\theta(L_i, L_j) = \|L_j\| \times \sin(\theta) \quad (13)$$

These three distances, vertical distance $d_\perp$, horizontal distance d, and angular distance $d_\theta$, may then be combined into an aggregated distance measure which may represent a similarity value between the two segments, e.g., two corresponding segments of the wellbore. The aggregation may proceed using any desired operator, e.g., average, minimum, maximum, etc.

Returning to FIG. 3, calculating distances between corresponding segments at 310 may be repeated until, as determined at 312, no more segments are available (e.g., at all, or within the depth of interest), or the process 206 otherwise determines that no more distance calculations between segments of the offset well and the subject well are called for (e.g., if the distances exceed a certain threshold and it is apparent that the offset well is not sufficiently similar to the subject well so as to warrant continued consideration). In some embodiments, distance between segments may repeat until reaching a distal terminus of the subject well, e.g., in cases where the offset well goes deeper.

At this point, the process 206 may include determining a similarity value for the offset well based at least in part on the calculated distances between the corresponding segments, as at 314. Because there are multiple segments and potentially multiple different ways to calculate the distance, the similarity value may be a composite of multiple distance values. These values may be combined in any suitable way to arrive at such a composite value, e.g., by total distance, average distance, weighted average, etc.

The process 206 may then determine whether to consider another offset well from the offset well data set, as at 316. If no further wells are to be considered, the process 206 may end, and the method 200 may proceed to selecting the offset wells for well analysis at 208 (FIG. 2). Otherwise, the process 206 may loop back to selecting another offset well at 302 and iterate through again.

Figure 6:
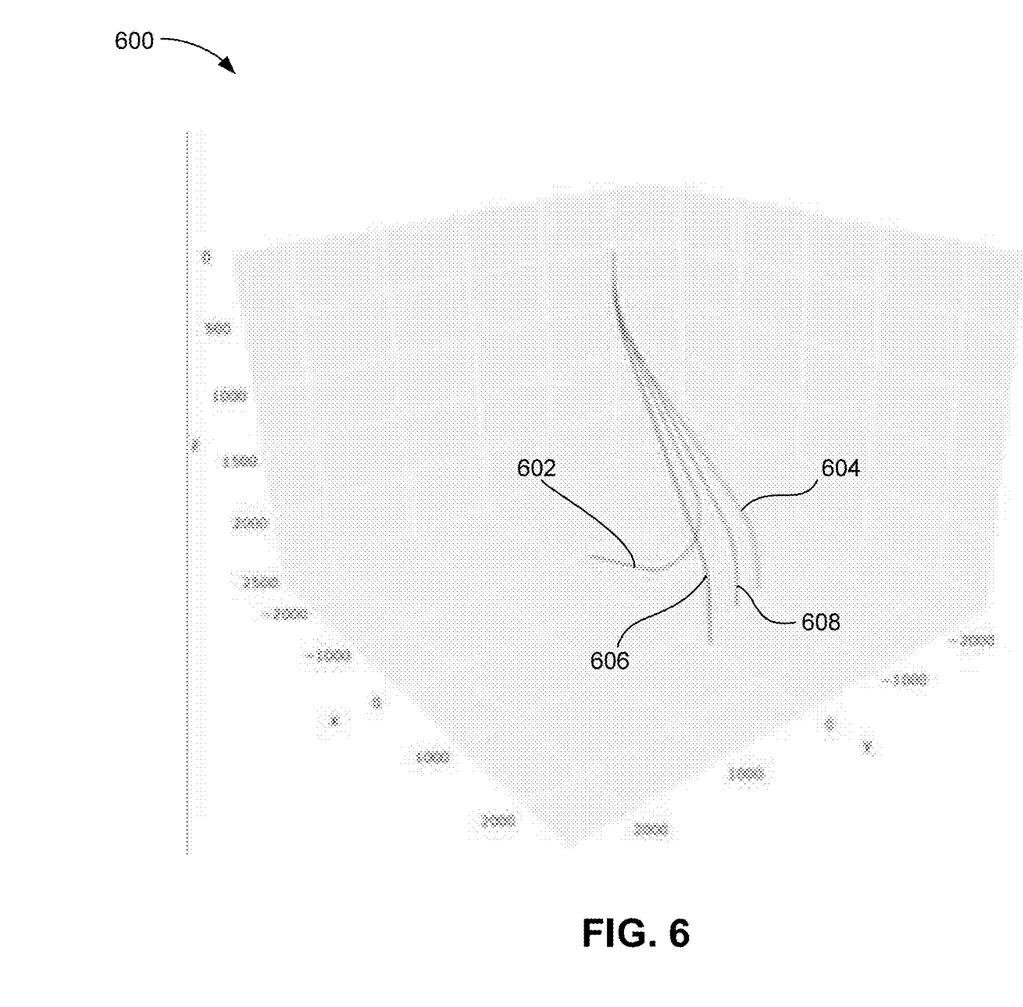
FIG. 6 illustrates a visualization a subject well and several offset wells, according to an embodiment.

As mentioned with reference to box 210 of FIG. 2, the method 200 may include displaying a digital model of one or more of the offset wells (e.g., those selected based on relatively high similarity) and the subject well. FIG. 6 illustrates an example of a plot of such a visualization 600. In the visualization 600, three offset wells 602, 604, 606 are shown, facilitating a comparison between the three offset wells 602, 604, 606 and a subject well 608. As mentioned above, such visualizations may enable a user to incorporate additional factors into the comparison of the offset wells.

Figure 7:
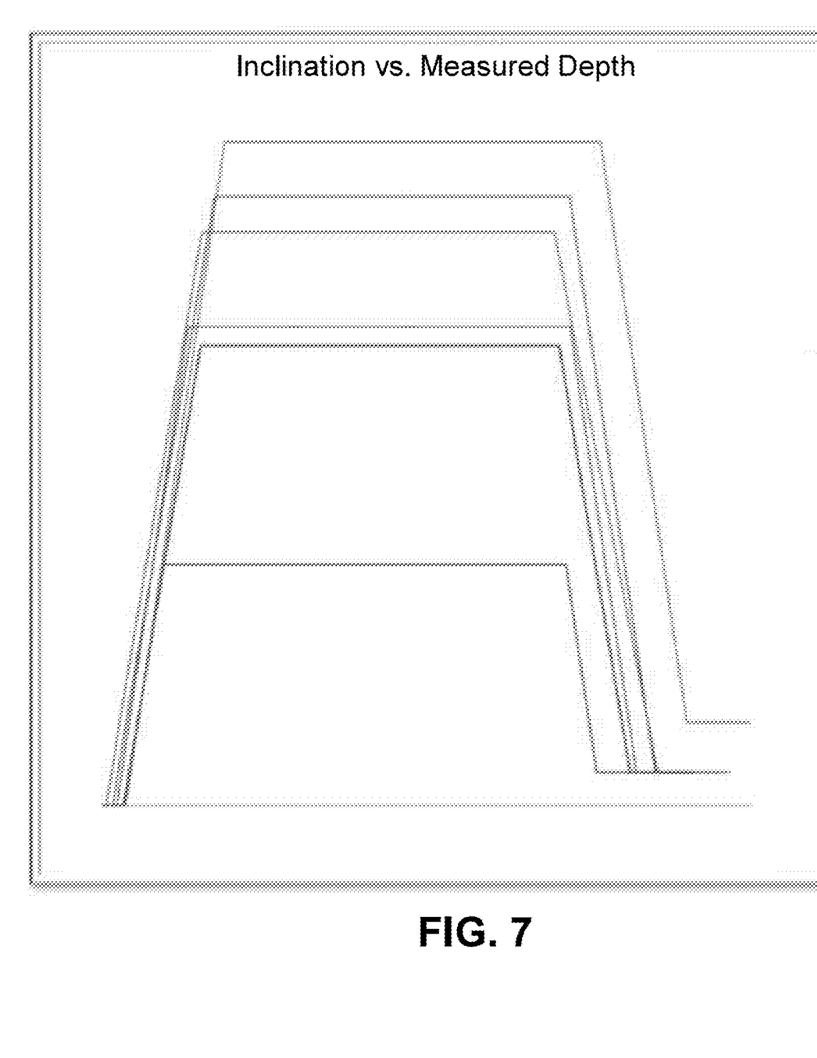
FIG. 7 illustrates a plot of inclination versus measured depth in a subject well and several similar offset wells, according to an embodiment.

FIG. 7 illustrates a comparison of inclination and measured depth. Here again, this visualization may allow a user to apply a more subjective approach to finding wellbore similarities. For example, the calculated similarity metric may be employed to winnow down the number of possible, similar wellbores, e.g., from thousands to dozens or fewer. Next, the wells or metrics thereof, may be displayed, e.g., as shown in FIGS. 6 and 7, and may allow a user to factor in other relevant considerations, as discussed above.

Figure 8:
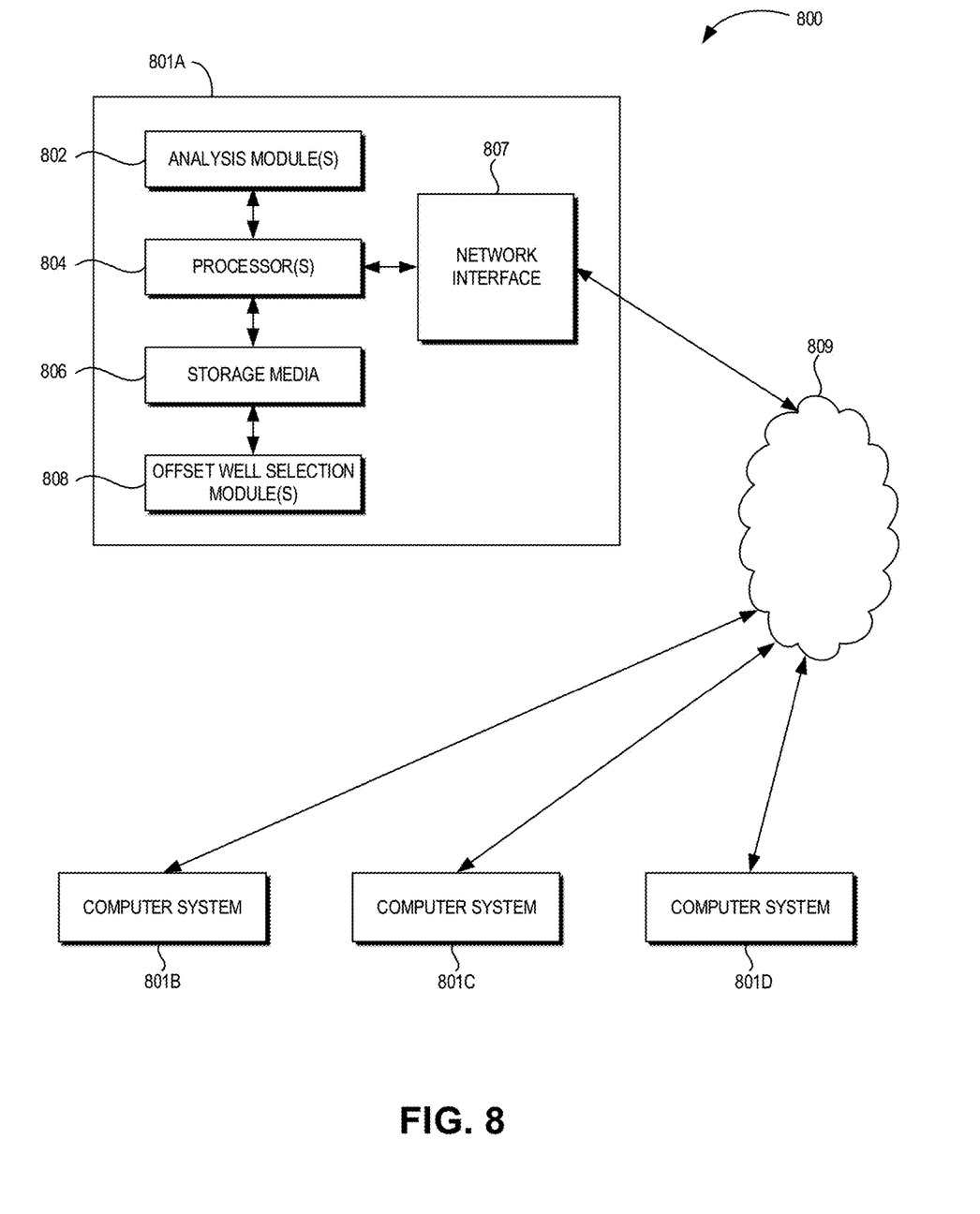
FIG. 8 illustrates a schematic view of a computing system, according to an embodiment.

In some embodiments, the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis modules 802 that are configured to perform various tasks according to some embodiments, such as one or more methods disclosed herein. To perform these various tasks, the analysis module 602 executes independently, or in coordination with, one or more processors 804, which is (or are) connected to one or more storage media 806. The processor(s) 804 is (or are) also connected to a network interface 808 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor may include a microprocessor, microcontroller, processor module or subsystem, programmable integrated circuit, programmable gate array, or another control or computing device.

The storage media 806 may be implemented as one or more computer-readable or machine-readable storage media. Note that while in the example embodiment of FIG. 8 storage media 806 is depicted as within computer system 801A in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 800 contains one or more offset well selection module(s) 808. In the example of computing system 800, computer system 801A includes the offset well selection module 808. In some embodiments, a single offset well selection module may be used to perform some aspects of one or more embodiments of the methods disclosed herein. In other embodiments, a plurality of offset well selection modules may be used to perform some aspects of methods herein.

It should be appreciated that computing system 800 is merely one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 800, FIG. 8), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method for offset well analysis, comprising:
receiving offset well data collected from a plurality of existing offset wells, wherein the offset well data comprises experiential data regarding past events on the plurality of existing offset wells, and wherein the offset well data comprises data representing a trajectory of each existing offset well of the plurality of existing offset wells;
receiving subject well data comprising a trajectory of at least a portion of a potential subject well;
partitioning the trajectory of each existing offset well of the plurality of existing offset wells into a plurality of offset well segments;

partitioning the trajectory of the potential subject well into a plurality of subject well segments;

determining a distance between at least some of the plurality of offset well segments of each existing offset well of the plurality of existing offset wells and at least some of the plurality of subject well segments, wherein a surface location of a top of each existing offset well of the plurality of existing offset wells and a surface location of a top of the potential subject well are considered to be the same, wherein determining the distance comprises determining a plurality of distances between corresponding segments of the plurality of offset well segments and the plurality of subject well segments, wherein determining the distance comprises combining the plurality of distances, and wherein the distance comprises one of: a total of the plurality of distances, an average of the plurality of distances, or a weighted average of the plurality of distances;

selecting an existing offset well from among the plurality of existing offset wells based in part on the distance;

performing an offset well analysis using the existing offset well and the potential subject well; and adjusting the trajectory of the potential subject well, or one or more drilling parameters for the potential subject well, or both based at least in part on the offset well analysis.

2. The method of claim 1, wherein determining the distance comprises calculating a Euclidean distance between an inclination and an azimuth turn rate of one of the plurality of subject well segments and one of the plurality of offset well segments.

3. The method of claim 1, wherein determining the distance comprises calculating a modified Hausdorff distance between a first segment of the plurality of subject well segments and a second segment of the plurality of offset well segments, the first and second segments having corresponding depths.

4. The method of claim 1, further comprising determining a depth interval of interest, wherein the at least some of the plurality of subject well segments and the at least some of the plurality of offset well segments are defined in the depth interval of interest.

5. The method of claim 1, further comprising:
receiving a set of rules defining a similarity between the existing offset well and the potential subject well, wherein determining the distance comprises applying the set of rules to the existing offset well and the potential subject well to quantify the similarity therebetween.

6. A computing system, comprising:
one or more processors; and
a memory system comprising one or more non-transitory computer-readable media storing instructions that, when executed by at least one of the one or more processors, cause the computing system to perform operations, the operations comprising:
receiving offset well data collected from a plurality of existing offset wells, wherein the offset well data comprises experiential data regarding past events on the plurality of existing offset wells, and wherein the offset well data comprises data representing a trajectory of each existing offset well of the plurality of existing offset wells;
receiving subject well data comprising a trajectory of at least a portion of a potential subject well;

partitioning the trajectory of each existing offset well of the plurality of existing offset wells into a plurality of offset well segments;

partitioning the trajectory of the potential subject well into a plurality of subject well segments;

determining a distance between at least some of the plurality of offset well segments of each existing offset well of the plurality of existing offset wells and at least some of the plurality of subject well segments, wherein a starting surface location of each existing offset well of the plurality of existing offset wells and a starting surface location of the potential subject well are considered to be the same, wherein determining the distance comprises determining a plurality of distances between corresponding segments of the plurality of offset well segments and the plurality of subject well segments, wherein determining the distance comprises combining the plurality of distances, and wherein the distance comprises one of: a total of the plurality of distances, an average of the plurality of distances, or a weighted average of the plurality of distances;

selecting an existing offset well from among the plurality of existing offset wells based in part on the distance;

performing an offset well analysis using the existing offset well and the potential subject well; and adjusting the trajectory of the potential subject well, or one or more drilling parameters for the potential subject well, or both based at least in part on the offset well analysis.

7. The computing system of claim 6, wherein determining the distance comprises determining the distance between corresponding segments of the plurality of offset well segments and the plurality of subject well segments, and wherein a surface location of the offset well and the potential subject well are considered to be the same.

8. The computing system of claim 6, wherein the operations further comprise determining a depth interval of interest, wherein the at least some of the plurality of subject well segments and the at least some of the plurality of offset well segments are defined in the depth interval of interest.

9. The computing system of claim 6, wherein the operations further comprise:
receiving a set of rules defining a similarity between the existing offset well and the potential subject well, wherein determining the distance comprises applying the set of rules to the existing offset well and the potential subject well to quantify the similarity therebetween.

10. The computing system of claim 6, further comprising displaying a visualization of the existing offset well and the potential subject well representing the distance therebetween.

11. The computing system of claim 10, wherein the operations further comprise:
determining a set of potentially relevant offset wells based on the distance; and
selecting one or more of the set of the potentially relevant offset wells based on the visualization, wherein selecting the offset well comprises selecting from the one or more of the potentially relevant wells.

12. A non-transitory computer-readable medium storing instructions that, when executed by one or more processors of a computing system, cause the computing system to perform operations, the operations comprising:

receiving offset well data collected from a plurality of existing offset wells, wherein the offset well data comprises experiential data regarding past events on the plurality of existing offset wells, and wherein the offset well data comprises data representing a trajectory of each existing offset well of the plurality of existing offset wells;

receiving subject well data comprising a trajectory of at least a portion of a potential subject well;

partitioning the trajectory of each existing offset well of the plurality of existing offset wells into a plurality of offset well segments;

partitioning the trajectory of the potential subject well into a plurality of subject well segments;

determining a distance between at least some of the plurality of offset well segments of each existing offset well of the plurality of existing offset wells and at least some of the plurality of subject well segments, wherein determining the distance comprises determining the distance between corresponding segments of the plurality of offset well segments and the plurality of subject well segments, and wherein a surface location of a top of each existing offset well of the plurality of existing offset wells and a location of a top of the potential subject well are considered to be the same for purposes of determining the distance, the distance representing a similarity of the trajectory of the at least some of the plurality of offset well segments of each existing offset well of the plurality of existing offset wells and the trajectory of the at least some of the plurality of subject well segments of the potential subject well, wherein determining the distance comprises determining a plurality of distances between corresponding segments of the plurality of offset well segments and the plurality of subject well segments, wherein determining the distance comprises combining the plurality of distances, and wherein the distance comprises one of: a total of the plurality of distances, an average of the plurality of distances, or a weighted average of the plurality of distances;

selecting an existing offset well from among the plurality of existing offset wells based in part on the distance;

performing an offset well analysis using the existing offset well and the potential subject well; and adjusting the trajectory of the potential subject well, or one or more drilling parameters for the potential subject well, or both based at least in part on the offset well analysis.

13. The non-transitory, computer-readable medium of claim 12, wherein determining the distance comprises calculating a modified Hausdorff distance between a first segment of the plurality of subject well segments and a second segment of the plurality of offset well segments, the first and second segments having corresponding depths.

* * * * *